US008182769B2

(12) United States Patent
Chavarria

(10) Patent No.: US 8,182,769 B2
(45) Date of Patent: May 22, 2012

(54) CLEAN TRANSPORTATION SYSTEM

(75) Inventor: Jason Chavarria, Warsaw, IN (US)

(73) Assignee: Biomet Biologics, LLC, Warsaw, IN (US)

(*) Notice: Subject to any disclaimer, the term of this patent is extended or adjusted under 35 U.S.C. 154(b) by 1055 days.

(21) Appl. No.: 12/062,817

(22) Filed: Apr. 4, 2008

(65) Prior Publication Data

US 2009/0253566 A1 Oct. 8, 2009

(51) Int. Cl.

| | |
|---|---|
| ***B01L 3/00*** | (2006.01) |
| ***B04B 1/00*** | (2006.01) |
| ***B01L 3/14*** | (2006.01) |
| ***B01L 9/00*** | (2006.01) |
| ***G01N 1/00*** | (2006.01) |
| ***G01N 1/18*** | (2006.01) |

(52) U.S. Cl. ........ 422/547; 422/548; 422/549; 422/561; 436/176; 436/177

(58) Field of Classification Search .......... 422/547–550, 422/561; 494/43
See application file for complete search history.

(56) References Cited

U.S. PATENT DOCUMENTS

| | | | |
|---|---|---|---|
| 1,378,806 | A | 5/1921 | Ausubel |
| 1,948,388 | A | 2/1934 | Liberson |
| 1,950,137 | A | 3/1934 | Dowe |
| 2,112,160 | A | 3/1938 | Johnson |
| 2,322,753 | A | 6/1943 | Thomas |
| 2,533,004 | A | 12/1950 | Ferry et al. |
| 2,915,063 | A | 12/1959 | Cutter |
| RE25,113 | E | 1/1962 | Wilburn |
| 3,112,747 | A | 12/1963 | Cowley |
| 3,215,141 | A | 11/1965 | Podhora |
| 3,223,083 | A | 12/1965 | Cobey |
| 3,236,418 | A | 2/1966 | Dalle et al. |
| 3,314,427 | A | 4/1967 | Stafford |
| 3,406,686 | A | 10/1968 | Keller |

(Continued)

FOREIGN PATENT DOCUMENTS

| | | |
|---|---|---|
| CA | 2244697 | 8/1997 |

(Continued)

OTHER PUBLICATIONS

"The New Gold Standard" brochure for GPS® Mini and GPS® 11 Platelet Concentrate Separation Kit with ACD-A Anticoagulant, Biomet Biologics, Inc. (Dec. 2006), 7 pages.

(Continued)

*Primary Examiner* — Jill Warden
*Assistant Examiner* — Charles D Hammond
(74) *Attorney, Agent, or Firm* — Harness, Dickey

(57) ABSTRACT

A transportation system for transporting a biological material container between a sterile field and a nonsterile field and substantially maintaining sterility of the biological material container includes a housing assembly that removably houses the biological material container. The system also includes a port defined by the housing assembly, and the port provides communication into the biological material container from outside the housing assembly. The housing assembly includes a first member that covers a first portion of the biological material container such that a second portion of the biological material container extends from the first member. The housing assembly also includes a second member that covers the second portion of the biological material container. The second member is removably coupled to the first member to expose the second portion of the biological material container. A keying member that keys the transportation system in a centrifuge is also disclosed.

14 Claims, 5 Drawing Sheets

U.S. PATENT DOCUMENTS

| | | | |
|---|---|---|---|
| 3,435,944 | A | 4/1969 | Ishii |
| 3,467,096 | A | 9/1969 | Horn |
| 3,473,646 | A | 10/1969 | Burke |
| 3,552,394 | A | 1/1971 | Horn |
| 3,586,064 | A | 6/1971 | Brown et al. |
| 3,625,353 | A | 12/1971 | Ishii |
| 3,654,925 | A | 4/1972 | Holderith |
| 3,685,248 | A | 8/1972 | Godelaine |
| 3,767,085 | A | 10/1973 | Cannon et al. |
| 3,780,935 | A | 12/1973 | Lukacs et al. |
| 3,800,947 | A | 4/1974 | Smith |
| 3,828,980 | A | 8/1974 | Creighton et al. |
| 3,894,952 | A | 7/1975 | Ayres |
| 3,937,219 | A | 2/1976 | Karakashian |
| 3,976,073 | A | 8/1976 | Quick et al. |
| 4,021,352 | A | 5/1977 | Sarstedt et al. |
| 4,040,420 | A | 8/1977 | Speer |
| 4,057,499 | A | 11/1977 | Buono |
| 4,121,739 | A | 10/1978 | Devaney et al. |
| 4,142,668 | A | 3/1979 | Lee |
| 4,184,593 | A | 1/1980 | Dorr et al. |
| 4,202,769 | A | 5/1980 | Greenspan |
| 4,226,235 | A | 10/1980 | Sarnoff et al. |
| 4,260,077 | A | 4/1981 | Schroeder |
| 4,269,174 | A | 5/1981 | Adair |
| 4,322,298 | A | 3/1982 | Persidsky |
| 4,359,049 | A | 11/1982 | Redl et al. |
| 4,375,272 | A | 3/1983 | Sutton, III |
| 4,413,773 | A | 11/1983 | Rohde et al. |
| 4,424,132 | A | 1/1984 | Iriguchi et al. |
| 4,434,820 | A | 3/1984 | Glass |
| 4,465,476 | A | 8/1984 | Gahwiler et al. |
| 4,467,588 | A | 8/1984 | Carveth |
| 4,498,904 | A | 2/1985 | Turner et al. |
| 4,524,770 | A | 6/1985 | Orandi |
| 4,610,666 | A | 9/1986 | Pizzino |
| 4,627,879 | A | 12/1986 | Rose et al. |
| 4,628,969 | A | 12/1986 | Jurgens, Jr. et al. |
| 4,631,055 | A | 12/1986 | Redl et al. |
| 4,650,468 | A | 3/1987 | Jennings, Jr. |
| 4,673,395 | A | 6/1987 | Phillips et al. |
| 4,714,457 | A | 12/1987 | Alterbaum |
| 4,734,261 | A | 3/1988 | Koizumi et al. |
| 4,735,616 | A | 4/1988 | Eibl et al. |
| 4,744,955 | A | 5/1988 | Shapiro |
| 4,767,026 | A | 8/1988 | Keller et al. |
| 4,818,386 | A | 4/1989 | Burns |
| 4,822,340 | A | 4/1989 | Kamstra et al. |
| 4,826,048 | A | 5/1989 | Skorka et al. |
| 4,828,716 | A | 5/1989 | McEwen et al. |
| 4,874,368 | A | 10/1989 | Miller et al. |
| 4,877,520 | A | 10/1989 | Burns |
| 4,878,903 | A | 11/1989 | Mueller |
| 4,902,281 | A | 2/1990 | Avoy |
| 4,907,019 | A | 3/1990 | Stephens |
| 4,932,942 | A | 6/1990 | Maslanka et al. |
| 4,957,637 | A | 9/1990 | Cornell |
| 4,978,336 | A | 12/1990 | Capozzi et al. |
| 4,979,942 | A | 12/1990 | Wolf et al. |
| 5,032,117 | A | 7/1991 | Motta |
| 5,033,252 | A | 7/1991 | Carter |
| 5,049,135 | A | 9/1991 | Davis |
| 5,074,844 | A | 12/1991 | Zdeb et al. |
| 5,080,262 | A | 1/1992 | Herold et al. |
| 5,104,375 | A | 4/1992 | Wolf et al. |
| 5,104,387 | A | 4/1992 | Pokorney et al. |
| 5,116,315 | A | 5/1992 | Capozzi et al. |
| 5,147,323 | A | 9/1992 | Haber et al. |
| 5,152,905 | A | 10/1992 | Pall et al. |
| 5,160,021 | A | 11/1992 | Sibley et al. |
| 5,176,658 | A | 1/1993 | Ranford |
| 5,217,118 | A | 6/1993 | Mochizuki et al. |
| 5,226,558 | A | 7/1993 | Whitney et al. |
| 5,226,877 | A | 7/1993 | Epstein |
| 5,226,887 | A | 7/1993 | Farr et al. |
| 5,253,785 | A | 10/1993 | Haber et al. |
| 5,286,257 | A | 2/1994 | Fischer |
| 5,290,259 | A | 3/1994 | Fischer |
| 5,292,318 | A | 3/1994 | Haber et al. |
| 5,298,024 | A | 3/1994 | Richmond |
| 5,300,041 | A | 4/1994 | Haber et al. |
| 5,308,041 | A | 5/1994 | Griffioen et al. |
| 5,314,412 | A | 5/1994 | Rex et al. |
| 5,318,524 | A | 6/1994 | Morse et al. |
| 5,322,510 | A | 6/1994 | Lindner et al. |
| 5,332,092 | A | 7/1994 | Fischer |
| 5,354,483 | A | 10/1994 | Furse |
| 5,361,906 | A | 11/1994 | Sterett |
| 5,368,563 | A | 11/1994 | Lonneman et al. |
| 5,372,586 | A | 12/1994 | Haber et al. |
| 5,376,079 | A | 12/1994 | Holm et al. |
| 5,390,792 | A | 2/1995 | Van Ness et al. |
| 5,393,497 | A | 2/1995 | Haber et al. |
| 5,393,674 | A | 2/1995 | Levine et al. |
| 5,409,465 | A | 4/1995 | Boggs et al. |
| 5,411,465 | A | 5/1995 | Glen et al. |
| 5,419,491 | A | 5/1995 | Breitsprecher |
| 5,420,250 | A | 5/1995 | Lontz |
| 5,445,614 | A | 8/1995 | Haber et al. |
| 5,454,793 | A | 10/1995 | Levander et al. |
| 5,464,396 | A | 11/1995 | Barta et al. |
| 5,474,540 | A | 12/1995 | Miller et al. |
| 5,478,323 | A | 12/1995 | Westwood et al. |
| 5,480,068 | A | 1/1996 | Frazier et al. |
| 5,484,431 | A | 1/1996 | Scharf et al. |
| 5,505,704 | A | 4/1996 | Pawelka et al. |
| 5,510,102 | A | 4/1996 | Cochrum |
| 5,519,422 | A | 5/1996 | Thoman et al. |
| 5,519,931 | A | 5/1996 | Reich |
| 5,520,657 | A | 5/1996 | Sellers et al. |
| 5,520,658 | A | 5/1996 | Holm et al. |
| 5,522,804 | A | 6/1996 | Lynn |
| 5,530,531 | A | 6/1996 | Girard |
| 5,542,934 | A | 8/1996 | Silver |
| 5,549,651 | A | 8/1996 | Lynn |
| 5,582,596 | A | 12/1996 | Fukunaga et al. |
| 5,585,007 | A | 12/1996 | Antanavich et al. |
| 5,597,530 | A | 1/1997 | Smith et al. |
| 5,605,255 | A | 2/1997 | Reidel et al. |
| 5,605,541 | A | 2/1997 | Holm |
| 5,638,661 | A | 6/1997 | Banks |
| 5,643,206 | A | 7/1997 | Fischer |
| 5,656,035 | A | 8/1997 | Avoy |
| 5,665,067 | A | 9/1997 | Linder et al. |
| 5,697,915 | A | 12/1997 | Lynn |
| 5,728,075 | A | 3/1998 | Levander et al. |
| 5,752,626 | A | 5/1998 | Bachand |
| 5,759,169 | A | 6/1998 | Marx |
| 5,759,171 | A | 6/1998 | Coelho et al. |
| 5,792,103 | A | 8/1998 | Schwartz et al. |
| 5,810,885 | A | 9/1998 | Zinger et al. |
| 5,814,022 | A | 9/1998 | Antanavich et al. |
| 5,814,066 | A | 9/1998 | Spotnitz |
| 5,819,988 | A | 10/1998 | Sawhney et al. |
| 5,824,012 | A | 10/1998 | Burchett et al. |
| 5,830,547 | A | 11/1998 | MacKenzie et al. |
| 5,842,326 | A | 12/1998 | Wolf |
| 5,871,700 | A | 2/1999 | Konrad |
| 5,881,536 | A | 3/1999 | Muller-Wille et al. |
| 5,888,408 | A | 3/1999 | Nagels |
| 5,935,437 | A | 8/1999 | Whitmore |
| 5,951,517 | A | 9/1999 | Lampropoulos et al. |
| 5,968,018 | A | 10/1999 | Freeman et al. |
| 5,976,102 | A | 11/1999 | Epstein |
| 5,980,866 | A | 11/1999 | Uchida et al. |
| 5,997,811 | A | 12/1999 | Esposito |
| 5,997,881 | A | 12/1999 | Powell et al. |
| 6,001,259 | A | 12/1999 | Whitmore |
| 6,059,749 | A | 5/2000 | Marx |
| 6,063,055 | A | 5/2000 | Epstein et al. |
| 6,079,868 | A | 6/2000 | Rydell |
| 6,099,511 | A | 8/2000 | Devos et al. |
| 6,113,571 | A | 9/2000 | Zinger et al. |
| 6,123,687 | A | 9/2000 | Simonyi et al. |
| 6,132,396 | A | 10/2000 | Antanavich et al. |
| 6,206,905 | B1 | 3/2001 | Holm et al. |
| 6,234,994 | B1 | 5/2001 | Zinger et al. |

| | | | | |
|---|---|---|---|---|
| 6,251,370 | B1 | 6/2001 | Uchida et al. | |
| 6,308,747 | B1 | 10/2001 | Farris | |
| 6,328,229 | B1 | 12/2001 | Duronio et al. | |
| 6,331,172 | B1 | 12/2001 | Epstein et al. | |
| 6,394,982 | B1 | 5/2002 | Ehrenfels | |
| 6,471,670 | B1 | 10/2002 | Enrenfels et al. | |
| 6,475,193 | B1 | 11/2002 | Park | |
| 6,488,650 | B1 | 12/2002 | Epstein et al. | |
| 6,544,162 | B1 | 4/2003 | Van Wie et al. | |
| 6,648,133 | B1 | 11/2003 | Blaschke et al. | |
| 6,711,879 | B2 | 3/2004 | Korteweg et al. | |
| 6,830,762 | B2 | 12/2004 | Baugh et al. | |
| 6,959,812 | B2 | 11/2005 | Reif et al. | |
| 7,179,391 | B2 | 2/2007 | Leach et al. | |
| 7,223,346 | B2 | 5/2007 | Dorian et al. | |
| 7,374,678 | B2 | 5/2008 | Leach et al. | |
| 7,470,371 | B2 | 12/2008 | Dorian et al. | |
| 7,766,900 | B2 | 8/2010 | Leach et al. | |
| 2001/0016709 | A1 | 8/2001 | Tovey et al. | |
| 2002/0035820 | A1 | 3/2002 | Farris | |
| 2002/0104808 | A1 | 8/2002 | Blasetti et al. | |
| 2003/0023203 | A1 | 1/2003 | Lavi et al. | |
| 2003/0029763 | A1 | 2/2003 | Reif et al. | |
| 2003/0139774 | A1 | 7/2003 | Epstein et al. | |
| 2004/0024353 | A1 | 2/2004 | Petersen et al. | |
| 2004/0035743 | A1 | 2/2004 | Tighe et al. | |
| 2004/0065626 | A1 | 4/2004 | Woo | |
| 2004/0209755 | A1* | 10/2004 | Moore et al. | 494/20 |
| 2005/0247715 | A1* | 11/2005 | Ellsworth et al. | 220/501 |
| 2006/0064070 | A1 | 3/2006 | Martin | |
| 2006/0175242 | A1 | 8/2006 | Dorian et al. | |
| 2006/0196885 | A1 | 9/2006 | Leach et al. | |
| 2006/0217674 | A1* | 9/2006 | Romano et al. | 604/320 |
| 2006/0273049 | A1 | 12/2006 | Leach et al. | |
| 2006/0273050 | A1 | 12/2006 | Higgins et al. | |
| 2006/0278588 | A1 | 12/2006 | Woodell-May | |
| 2007/0012623 | A1 | 1/2007 | Robinson et al. | |
| 2008/0217264 | A1 | 9/2008 | Leach et al. | |
| 2008/0217265 | A1 | 9/2008 | Leach et al. | |
| 2008/0283474 | A1 | 11/2008 | Leach et al. | |
| 2009/0014391 | A1 | 1/2009 | Leach et al. | |
| 2009/0221075 | A1 | 9/2009 | Dorian et al. | |
| 2009/0250413 | A1 | 10/2009 | Hoeppner | |
| 2010/0274206 | A1 | 10/2010 | Leach et al. | |

FOREIGN PATENT DOCUMENTS

| | | | |
|---|---|---|---|
| CA | 2295733 | A1 | 1/1999 |
| DE | 632579 | | 9/1936 |
| DE | 807113 | | 6/1951 |
| DE | 3246999 | A1 | 5/1984 |
| DE | 8913761 | | 3/1990 |
| DE | 29516650 | | 1/1996 |
| EP | 0208053 | A2 | 1/1987 |
| EP | 0253418 | A1 | 1/1988 |
| EP | 0253949 | A2 | 1/1988 |
| EP | 0292472 | | 11/1988 |
| EP | 0316284 | A1 | 5/1989 |
| EP | 0432871 | A2 | 6/1991 |
| EP | 0528949 | A1 | 3/1993 |
| EP | 592242 | | 4/1994 |
| EP | 0858776 | | 8/1998 |
| FR | 840257 | A | 4/1939 |
| FR | 2612782 | | 9/1988 |
| FR | 2661097 | | 10/1991 |
| FR | 2666986 | A1 | 3/1992 |
| FR | 2668060 | | 4/1992 |
| JP | 08238314 | A | 9/1996 |
| JP | 08280802 | A | 10/1996 |
| JP | 09108302 | A | 4/1997 |
| WO | WO-8807874 | | 10/1988 |
| WO | WO-9001959 | | 3/1990 |
| WO | WO-9101711 | | 2/1991 |
| WO | WO-9117778 | A1 | 11/1991 |
| WO | WO-9419038 | | 9/1994 |
| WO | WO-9639212 | | 12/1996 |
| WO | WO-9725015 | A1 | 7/1997 |
| WO | WO-9728834 | | 8/1997 |
| WO | WO-9746203 | A1 | 12/1997 |
| WO | WO-9747343 | A1 | 12/1997 |
| WO | WO-9802098 | | 1/1998 |
| WO | WO-9810703 | | 3/1998 |
| WO | WO-9810704 | | 3/1998 |
| WO | WO-9813094 | | 4/1998 |
| WO | WO-9840115 | | 9/1998 |
| WO | WO-9901069 | | 1/1999 |
| WO | WO-03018425 | A1 | 3/2003 |

OTHER PUBLICATIONS

International Search Report mailed Jul. 10, 2009 for PCT/US2009/039488 claiming benefit of U.S. Appl. No. 12/062,817, filed Apr. 4, 2008.

International Preliminary Examination Report issued Oct. 5, 2010 for PCT/US2009/039488 claiming benefit of U.S. Appl. No. 12/062,817, filed Apr. 4, 2008.

Alving, B.M., M.J. Weinstein, et al. (1995). "Fibrin sealant: summary of a conference on characteristics and clinical uses." Transfusion 35(9): 783-90.

B. Braun/McGaw Product Catalog, May 1, 1999.

DePuy AcroMed, Inc., Symphony™ Platelet Concentrate System, 2001.

Developing Technologies for Accelerating Healing, Naturally®, Smart PReP® 2, Harvest® Technologies Corp. 2002 (6 pages).

Drug Intelligence and Clinical Pharmacy, vol. 22, pp. 946-952, Dec. 1988, Dennis F. Thompson, et al., "Fibrin Glue: A Review of Its Preparation, Efficacy, and Adverse Effects as a Topical Hemostat".

DynaStat™, Introducing DynaStat™ Surgical Hemostat—An Innovation in Hemostatic Biodevices, 2000 Cohesion Technologies, Inc.

FibriJet® 11:1 Ratio Applicator, Micromedics, Inc., printed from www.micromedics-usa.com/products/PDFs/FibriJet_Easy-Assembly.pdf, in 2005 (1 page).

FibriJet® product sheet, Micromedics, Inc., printed from www.micromedics-usa.com/products/PDFs/product_sheet.pdf, in 2005 (2 pages).

FibriJet® Ratio Applicator for application of platelet gel, Micromedics, Inc., printed from www.micromedics-usa.com/products/PDFs/ratio.pdf, in 2005 (1 page).

CFT Cell Factor Technologies, Inc., GPS® II Platelet Concentrate System, 2004 Biomet Orthopedics, Inc. (10 pages).

Matras, H. (1985). "Fibrin seal: the state of the art." J Oral Maxillofac Surg 43(8): 605-11.

Matras, Helene, H. P. Dinges, H. Lassmann, and B. Mamoli. "Zur nahtlosen interfaszikularen Nerventransplantation im Tierexperiment." Wein Med Woschtr 122 (37 1972): 517-523.

OEM Products Catalog, Merit® Medical, available by Jan. 2003.

Prof. H. Stütz, M.D., et al., The Use of Autologous Fibrin Glue to Reduce Perioperative Blood Loss in Total Knee Arthroplasty—Results of a Controlled Study, Translated from the original article published in Orthopädische Praxis 40, 12 (2004).

Redl, H. and G. Schlag (1986). Fibrin Sealant and Its Modes of Application. Fibrin Sealant in Operative Medicine. G. Schlad and H. Redl. Heidelberg, Springer-Verlag: 13-26.

Redl, H.G. Schlag, et al. (1982). "Methods of Fibrin Seal Application." Thorac, cardiovasc. Surgeon 30: 223-227.

Shimada, J.K. Mikami, et al. (1995). "Closure of leaks by fibrin gluing. Effects of various application techniques and temperatures." J Cardiovac Surg (Torino) 35(2): 181-4.

Sierra, D. H. "Fibrin sealant adhesive systems: a review of their chemistry, material properties and clinical applications." *J Biomater Appl* 7 (Apr. 1993): 309-52.

Sporn, L.A., et al., (1995). "Cell proliferation on fibrin: modulation by fibrinopeptide cleavage." Blood 86(5): 1802-10.

Tange, R.A. (1986). "A New Application Method for Fibrin Sealant: The Glue Gun." Fibrin Sealant in Operative Medicine. G. Schlad and H. Redl. Heidelberg, Springer-Verlag.

Vox Sanq, vol. 68: 82-89, Feb. 1995, Boomgaard et. al, Pooled Platelet Concentrates Prepared by the Platelet-Rich-Plasma Method and Filtered with Three Different Filters and Stored for 8 Days.

* cited by examiner

CLEAN TRANSPORTATION SYSTEM

FIELD

This invention relates to a sterile biological material container, and more particularly, to a clean transportation system for a sterile container.

INTRODUCTION

Certain methods and devices have been proposed for maintaining sterility of biological materials when being transported between sterile and nonsterile fields. For instance, in some cases, blood is obtained in a sterile field from a patient and is introduced into a sterile vessel where it is protected from contamination. Then, the vessel is transferred to a nonsterile field and is spun in a centrifuge to separate the components of the blood. Next, a syringe is used to aspirate one or more blood components from the vessel. Subsequently, the blood is aspirated from the syringe into one or more sterile cups located inside the sterile field, and one or more of the separated components is then used depending on the surgical procedure.

However, conventional methods and devices for transporting biological materials between sterile and nonsterile fields suffer from certain disadvantages. For instance, in the example discussed above, the sterility of the blood may be compromised, especially when the blood is introduced to the cups. More specifically, although the cups are located in the sterile field, the cups are still somewhat exposed to the environment inside the operating room, and contamination may occur.

Furthermore, these conventional methods and devices can be time consuming and inconvenient because the fluids are transferred between a substantial number of vessels. In addition, a substantial amount of waste can be produced using these methods because once a vessel is used, it is typically discarded.

SUMMARY

A transportation system for transporting a biological material container between a sterile field and a nonsterile field and substantially maintaining sterility of the biological material container is disclosed. The system includes a housing assembly that removably houses the biological material container. The system also includes a port defined by the housing assembly, and the port provides communication into the biological material container from outside the housing assembly. The housing assembly includes a first member that covers a first portion of the biological material container such that a second portion of the biological material container extends from the first member. The housing assembly also includes a second member that covers the second portion of the biological material container. The second member is removably coupled to the first member to expose the second portion of the biological material container.

In another aspect, a biological material container system is disclosed that includes a biological material container having a first portion and a second portion. The system also includes a transportation system for transporting the biological material container between a sterile field and a nonsterile field and substantially maintaining sterility of the biological material container. The transportation system includes a housing assembly that removably houses the biological material container and a port defined by the housing assembly. The port provides communication into the biological material container from outside the housing assembly. Also, the housing assembly includes a first member that covers a first portion of the biological material container such that the second portion of the biological material container extends from the first member. The housing assembly further includes a second member that covers the second portion of the biological material container. The second member is removably coupled to the first member to expose the second portion of the biological material container for removal of the biological material container from the first member of the housing assembly.

In still another aspect, a method of transporting a biological material container between a sterile field and a nonsterile field and substantially maintaining sterility of the biological material container is disclosed. The method includes encapsulating the biological material container within a housing assembly. The housing assembly includes a first member, a second member removably coupled to the first member, and a port providing communication into the biological material container from outside the housing assembly. The biological material container includes a first portion covered by the first member and a second portion covered by the second member and extending from the first member. The method additionally includes introducing a biological material into the biological material container via the port and transporting the biological material container within the housing assembly between the sterile field and the nonsterile field. Furthermore, the method includes decoupling the second member from the first member and exposing the second portion of the biological material container. Moreover, the method includes removing the biological material container from the first member via the second portion of the biological material container.

Furthermore, a transportation system for transporting a biological material container for centrifugation in a centrifuge is disclosed. The transportation system includes a housing assembly that removably houses the biological material container to maintain sterility of the biological material container. The transportation system also includes a keying member that keys the housing assembly in the centrifuge to maintain a predetermined orientation of the housing assembly in the centrifuge.

Moreover, a centrifuge system is disclosed that includes a housing assembly that removably houses a biological material container to maintain sterility of the biological material container. The centrifuge system also includes a centrifuge with a bucket that receives the housing assembly. The centrifuge centrifuges the housing assembly and the biological material container. Also, the centrifuge system includes a keying member that keys the housing assembly in the centrifuge bucket to maintain a predetermined orientation of the housing assembly in the centrifuge bucket.

Further areas of applicability of the present invention will become apparent from the detailed description provided hereinafter. It should be understood that the detailed description and specific examples, while indicating the embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
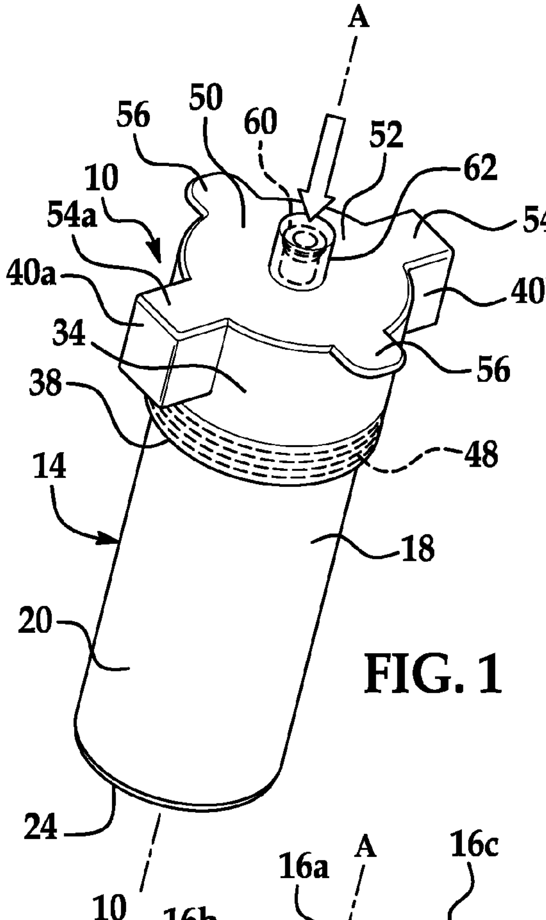
FIG. 1 is a perspective view of a biological material container system according to teachings of the present disclosure.

The following description of the embodiment(s) is merely exemplary in nature and is in no way intended to limit the invention, its application, or uses. Moreover, the container system described herein is discussed in association with a biological material container of a type shown in U.S. Pat. No. 7,179,391, which issued Feb. 20, 2007, U.S. Patent Publication No. 2005/0109716, which was filed on Sep. 2, 2004, and/or U.S. Patent Publication No. 2006/0278588, which was filed on May 26, 2006, each of which are incorporated herein by reference. However, it will be appreciated that the container system can be used in association with any suitable biological material container without departing from the scope of the present disclosure.

With initial reference now to FIGS. 1-4, a biological material container system 10 is illustrated. The system 10 generally includes a biological material container 12 and a transportation system 14. The biological material container 12 is removably disposed within the transportation system 14. Also, as will be discussed in greater detail, the transportation system 14 is suitable for transporting the biological material container 12 between a sterile field and a nonsterile field while substantially maintaining sterility of the biological material container 12.

The biological material container 12 is generally a hollow enclosed container. In some embodiments, the container 12 is generally cylindrical and defines an axis A. Furthermore, the container 12 includes at least one port 16*a*, 16*b*, 16*c*. The ports 16*a*, 16*b*, 16*c* provide fluid communication into and out of the container 12. The ports 16*a*, 16*b*, 16*c* can be Luer lock connectors of a male or female type. Furthermore, the ports 16*a*, 16*b*, 16*c* can include an associated cap (not specifically shown) for covering the corresponding ports 16*a*, 16*b*, 16*c*.

The container 12 can be used for containing any suitable biological material. For instance, in one embodiment, the container 12 is used for holding blood. Furthermore, in some embodiments, the container 12 can be inserted into a centrifuge (not specifically shown) for separating the biological materials into components of different densities. It will be appreciated that the container 12 could be of any suitable type. In some embodiments, the container 12 is of a type shown in U.S. Pat. No. 7,179,391, which issued Feb. 20, 2007, U.S. Patent Publication No. 2005/0109716, which was filed on Sep. 2, 2004, and/or U.S. Patent Publication No. 2006/0278588, which was filed on May 26, 2006, each of which are incorporated herein by reference. However, it will be appreciated that the container 12 could be of any other suitable type, including a syringe and the like.

The transportation system 14 generally includes a housing assembly 18 that removably houses (i.e., encapsulates) the biological material container 12 to substantially maintain sterility of the container 12. In some embodiments, the housing assembly 18 is substantially shaped according to an outer shape of the biological material container 12. Also, in some embodiments, the housing assembly 18 is made out of a substantially rigid material. For instance, in some embodiments, the housing assembly 18 is made of a relatively rigid polymer and formed using an injection molding process.

Figure 3:
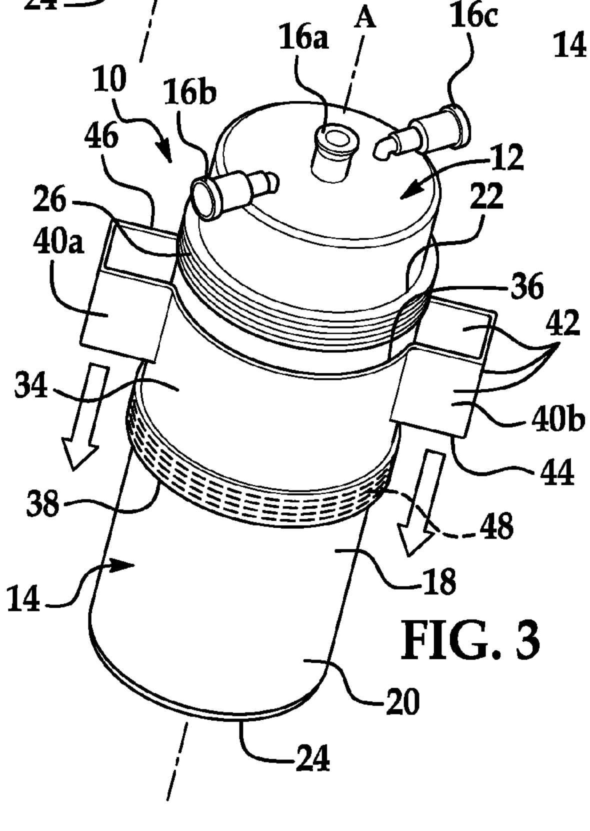
FIG. 3 is a perspective view of the biological material container system showing the system in a further disassembled state.
Figure 4:
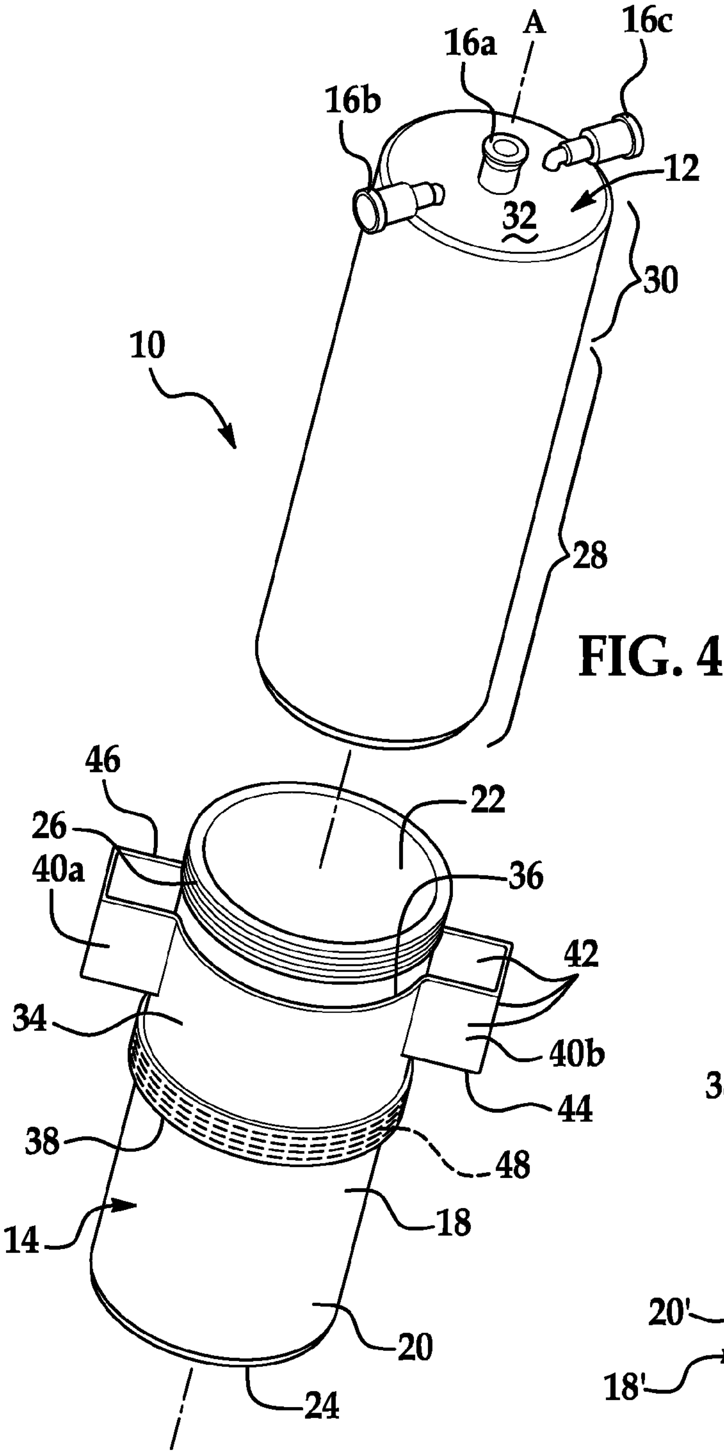
FIG. 4 is a perspective view of the biological material container system showing the system in a still further disassembled state.

The housing assembly 18 includes a first member 20. The first member 20 is substantially tubular in shape and hollow. Furthermore, the first member 20 defines an open end 22 (FIG. 4) and a closed bottom end 24. Furthermore, the first member 20 includes a threaded portion 26 (FIGS. 3 and 4). The threaded portion 26 is included on an outer surface of the first member 20 adjacent the open end 22.

When the container 12 is disposed within the housing assembly 18, the first member 20 covers a first portion 28 (FIG. 4) of the container 12. Also, the longitudinal length of the first member 20 is less than the longitudinal length of the container 12, and as such, a second portion 30 and a third portion 32 of the container 12 extend from and protrude out of the first member 20 of the housing assembly 18.

The housing assembly 18 further includes a second member 34. In some embodiments, the second member 34 is generally ring shaped so as to define a first open end 36 and a second open end 38.

Figure 2:
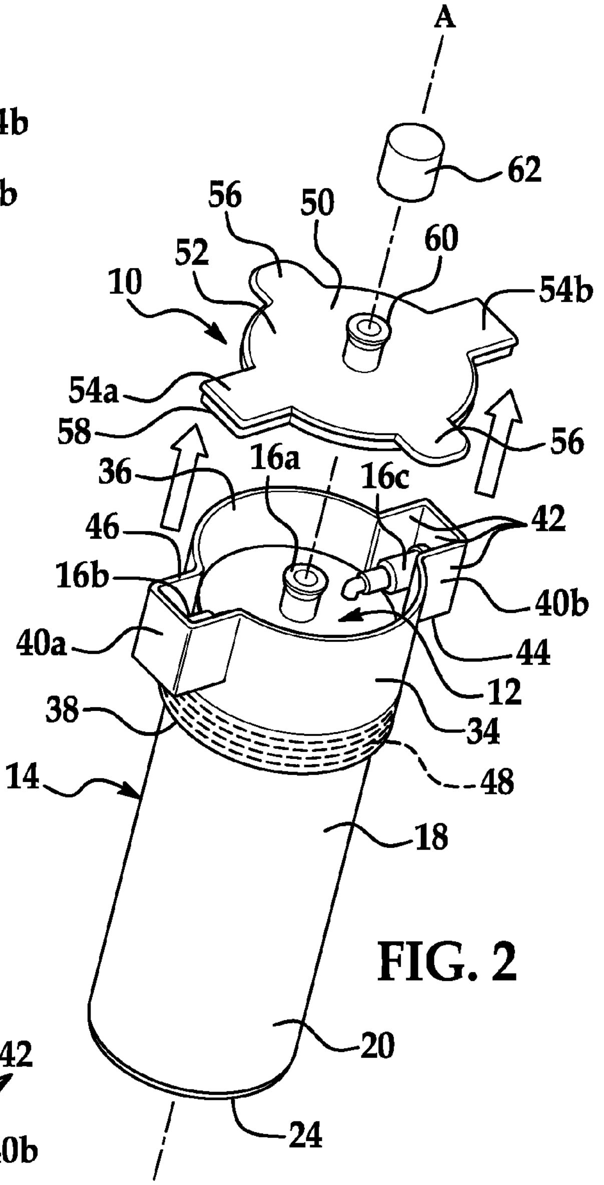
FIG. 2 is a perspective exploded view of the biological material container system showing the system partially disassembled.

The second member 34 also includes a plurality of hollow side members 40*a*, 40*b*. The side members 40*a*, 40*b* are substantially box shaped and include a plurality of side walls 42 and a bottom wall 44. The side members 40*a*, 40*b* also define an open top end 46. As shown in FIG. 2, the side members 40*a*, 40*b* each receive and accommodate a corresponding port 16*b*, 16*c* of the biological material container 12. Furthermore, the side members 40*a*, 40*b* can improve gripping and/or disassembly of the housing assembly 18 as will be described in greater detail below.

The second member 34 can also include a threaded portion 48. The threaded portion 48 can be included on an inner surface of the second member 34 adjacent the second open end 38.

As shown in FIGS. 3 and 4, the second member 34 slides over the first member 20 along the axis A. Furthermore, the threaded portion 48 of the second member 34 threadably engages with the threaded portion 26 of the first member 20. As such, the threaded portions 26, 48 comprise a threaded coupling member with which the second member 34 is removably coupled to the first member 20. In other words, when the second member 34 is threadably engaged with the first member 20, the second member 34 surrounds the first member 20 adjacent the open end 22 of the first member 20. Also, the second member 34 can threadably disengage from the first member 20 and slide away from the open end 22 along the axis A to expose the second portion 30 of the biological material container 12.

The housing assembly 18 additionally includes a cap member 50 (FIGS. 1 and 2). The cap member 50 is substantially disk shaped and flat. The cap member 50 includes a main body portion 52, a plurality of wings 54*a*, 54*b* and a plurality of tabs 56. In some embodiments, the main body portion 52, the wings 54*a*, 54*b*, and the tabs 56 are each integrally coupled. The cap member 50 is removably coupled to the second member 34 so as to cover the first open end 36 of the second member 34 and maintain the container 12 in a sterile condition.

In some embodiments, the cap member 50 is removably coupled to the second member 34, via a friction fit. More specifically, in some embodiments, the cap member 50 includes a recessed bottom surface 58 (FIG. 2) that is frictionally received in the first open end 36 of the second member 34. When coupled to the second member 34, the wings 54*a*, 54*b* extend over and cover the open ends 46 of the side members 40*a*, 40*b*, and the main body portion 52 substantially covers the remaining portions of the first open end 36.

Furthermore, the tabs 56 extend away from the axis A and outward from the second member 34. As will be explained, the tabs 56 enable removal of the cap member 50 from the housing assembly 18.

Additionally, when the cap member 50 is coupled to the second member 34, the cap member 50 substantially covers the third portion 32 of the biological material container 12.

The housing assembly 18 additionally defines a port 60 (FIGS. 1 and 2). In some embodiments, the port 60 is defined by the cap member 50. Also, in some embodiments, the port 60 is Luer lock connector of a male or female type. In some embodiments, the cap member 50 also includes a stem (not specifically shown) that is in fluid communication with the port 60, extends from the bottom surface 58, and is received within the port 16*a* of the biological material container 12. As such, the port 60 provides fluid communication with the port 16*a* of the container 12, and as will be explained, the port 60 provides communication into the biological material container 12 from outside the housing assembly 18.

Furthermore, the housing assembly 18 can include a port cover 62 (FIGS. 1 and 2). The port cover 62 is removably coupled to the port 60. The port cover 62 can be of a male or female type. The port cover 62 can also include a threaded cap that threads onto the port 60 and a separate plug (not specifically shown) that blocks the port 60 and maintains sterility in the housing assembly 18.

With reference now to FIGS. 1-4, assembly and disassembly of the biological material container system 10 will be discussed in greater detail. In some embodiments, the biological material container 12 is sterilized (e.g., by gamma radiation, in an autoclave, etc.), and the interior surfaces of the housing assembly 18 are also sterilized (e.g., by gamma radiation, in an autoclave, etc.). The container 12 is then inserted into the housing assembly 18 substantially as represented in FIG. 1. Also, in some embodiments, the container 12 is inserted into the housing assembly 18 as represented in FIG. 1, and the entire assembly is sterilized as one unit in any suitable manner (e.g., gamma radiation, in an autoclave, etc.) It will be appreciated that the biological material container system 10 can be packaged and sold as a sterile unit substantially as represented in FIG. 1. It will also be appreciated that the individual components can be sterilized and assembled by the consumer.

For purposes of the following discussion, it is assumed that the biological material container system 10 is assembled as represented in FIG. 1. It is also assumed that the biological material container 12 and the interior of the housing assembly 18 have been sterilized.

Initially, the port cover 62 is removed from the port 60, and blood or other biological material is introduced into the biological material container 12 through the ports 60, 16*a*. (The container 12 and the housing assembly 18 can include a vent (e.g., a hydrophobic vent) to allow pressure to equalize as the biological material is introduced into the biological material container 12.) Once the biological material has been introduced, the port cover 62 is re-coupled to the port 60. This can be performed inside or outside a sterile field.

More specifically, in some embodiments, an initial port cover 62 is removed and discarded, the biological material is introduced into the biological material container 12, and a new, sterile, replacement port cover 62 is coupled to the port 60. In some embodiments, the replacement port cover 62 is separately packaged or tethered to the housing assembly 18.

Furthermore, in some embodiments, the initial port cover 62 is removed, leaving a plug (not specifically shown) in the port 60. When it is time to introduce the biological material into the container 12, the plug is removed, and the biological material is introduced into the container 12. Then, a new replacement port cover 62 is coupled to the port 60.

Once the port cover 62 has been replaced, the biological material container system 10 can be moved (e.g., by a circulating nurse, etc.) to a nonsterile field for processing. In some embodiments, the biological material container system 10 is inserted into a centrifuge machine (not specifically shown), and the biological material in the container 12 is centrifuged to separate the components of the biological material. It will be appreciated that the container 12 remains substantially encased within the housing assembly 18 to substantially maintain sterility of the container 12 and the biological material within the container 12. As such, the centrifuge need not be sterilized before centrifuging the container 12.

Then, the biological material container system 10 can be moved to a sterile field (e.g., by the circulating nurse, etc.), and the nonsterile personnel (e.g., the circulating nurse, etc.) can disassemble the housing assembly 18 and expose the biological material container 12 for removal by sterile personnel (e.g., a scrub tech, etc.).

More specifically, in order to disassemble the housing assembly 18, the nonsterile personnel (e.g., the circulating nurse, etc.) holds onto the first member 20 and pushes up on the tabs 56 to move the cap member 50 in an axial direction along the axis A away from the second member 34. Next, the nonsterile personnel unthreads and decouples the second member 34 from the first member 20 by rotating the second member 34 about the axis A. In some embodiments, the threading of the threaded portions 26, 48 allows the second member 34 to be unthreaded from the first member 20 with one quarter to one-half of a full turn about the axis A; however, it will be appreciated that the threaded portions 26, 48 can have any suitable threading to allow the components to separate after any suitable amount of turning.

Once the second member 34 is threadably disengaged, the nonsterile personnel slides the second member 34 away from the open end 22 of the first member 20 along the axis A. This exposes the second portion 30 of the container 12 that protrudes from the open end 22. As such, sterile personnel (e.g., the scrub tech, etc.) is able to grasp the exposed second portion 30 of the container 12 and pull the container 12 out of the first member 20 along the axis A. It will be appreciated that this process substantially ensures that the container 12 and the biological material inside the container 12 remain sterile and uncontaminated.

Figure 5:
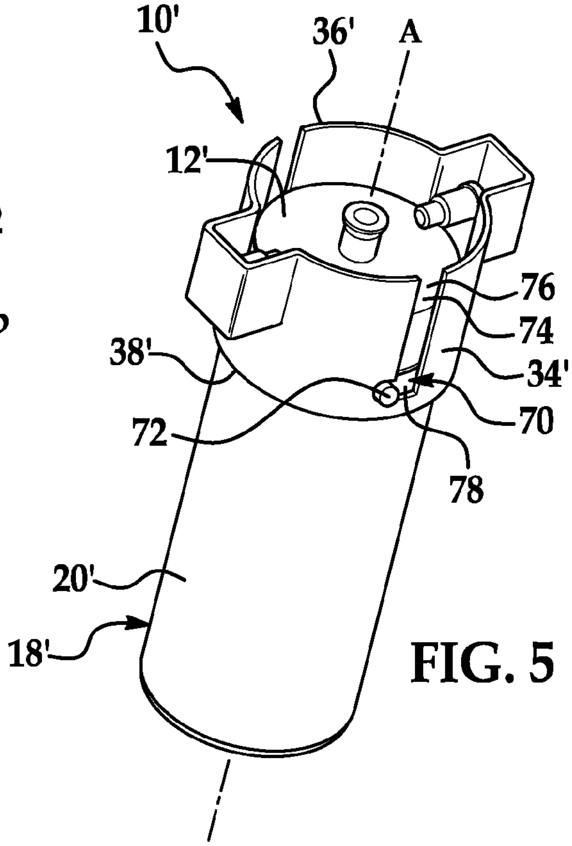
FIG. 5 is a perspective view of the biological material container system having another coupling.
Figure 6:
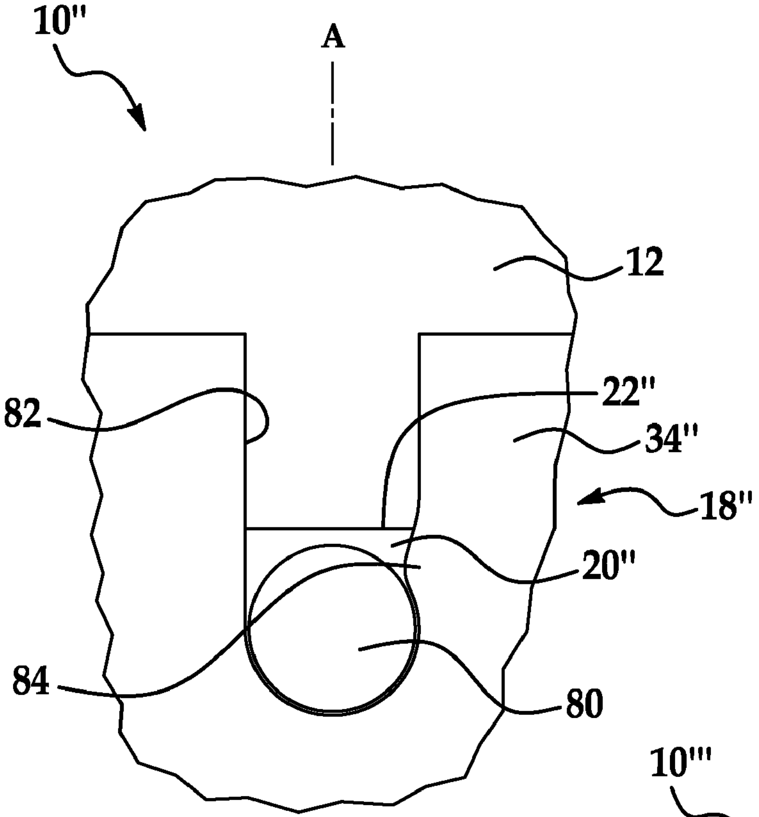
FIG. 6 is a side view of another coupling of the biological material container system.
Figure 7:
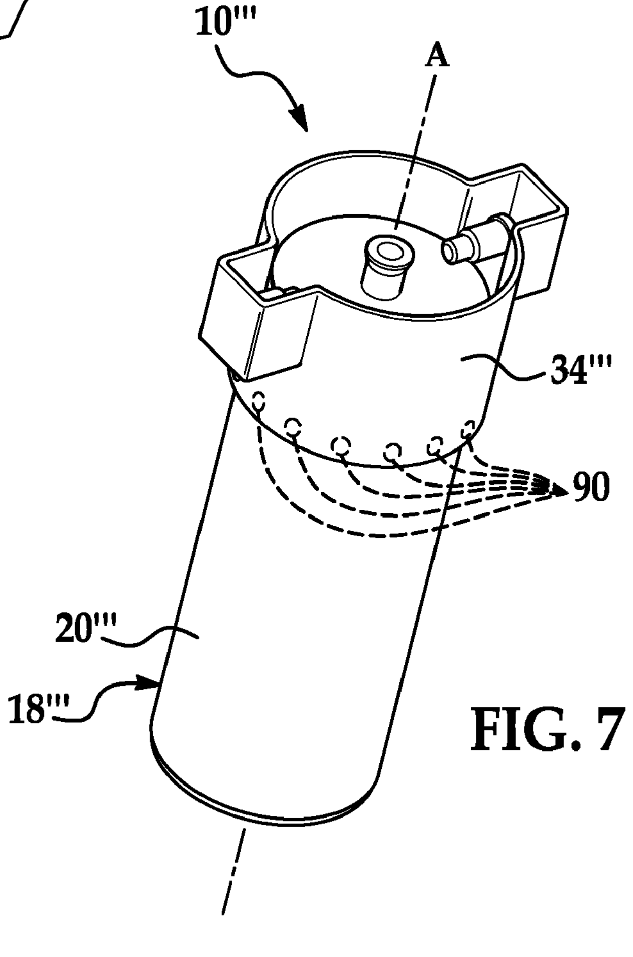
FIG. 7 is a perspective view of the biological material container system having still another coupling.

Referring now to FIGS. 5-7, various alternative embodiments of the coupling member removably coupling the second member 34 and the first member 20 will be described. It will be appreciated that the coupling members shown in FIGS. 5-7 can be used in addition to or as an alternative to the threaded coupling member shown in FIGS. 1-4.

In FIG. 5, the coupling member removably coupling the second member 34' and the first member 20' is a bayonet coupling, generally indicated at 70. More specifically, the first member 20' includes a post 72 that extends outward from the axis A. Furthermore, the second member 34' includes a slot 74 with a first portion 76 that extends generally along the axis A from the first open end 36' of the second member 34'. The slot 74 also includes a second portion 78 that extends in a circumferential direction adjacent the second open end 38' of the second member 34'. In order to disengage the second member 34' from the first member 20', the second member 34' is rotated about the axis A until the post 72 enters the first portion 76 of the slot 74, and then the second member 34' slides over the first member 20' along the axis A until the post 72 is removed from the slot 74. It will be appreciated that the post 72 could be included on the second member 34', and the slot 74 could be included on the first member 20' without departing from the scope of the present disclosure. Furthermore, it will be appreciated that the cap member 50 (not specifically shown) can be configured to substantially cover the slot 74 to substantially maintain sterility of the container 12 and the interior of the housing assembly 18'. Additionally, the slot 74 could be embedded within the second member 34' such that the slot 34' is open only to the interior of the second member 34' and such that the post 72 extends only partially into the second member 34'.

In FIG. 6, the first member 20" includes a post 80 that extends outward radially from the axis A. The second member 34" includes a corresponding slot 82 that extends substantially parallel to the axis A. The slot 82 includes a protrusion 84 that extends partially into the slot 82 generally in a circumferential direction about the axis A. The post 80 is removably retained within the slot 82. In other words, in order to remove the second member 34" from the first member 20", the second member 34" slides along the axis A away from the open end 22" of the first member 20", and the second member 34" deflects, thereby allowing the post 80 to pass the protrusion 84 and move out of the slot 82. To engage the first and second member 20", 34", the second member 34" slides along the axis A toward the open end 22" until the post 80 enters the slot 82. Further movement of the second member 34" in this direction causes the second member 34" to deflect, thereby allowing the post 80 to pass the protrusion 84 and be retained in the slot 82 by the protrusion 84. It will be appreciated that the housing assembly 18" can include any number of posts 80 and slot 82 combinations.

In FIG. 7, the coupling member removably coupling the second member 34'" to the first member 20'" includes a plurality of breakable bonded couplings 90. In some embodiments, the breakable bonded couplings 90 are heat stakes that bond the interior surface of the second member 34'" and the exterior surface of the first member 20'" in localized areas. It will be appreciated that the breakable bonded couplings 90 could be included at any suitable location, and the housing assembly 18'" could include any number of breakable bonded couplings 90.

Figure 8:
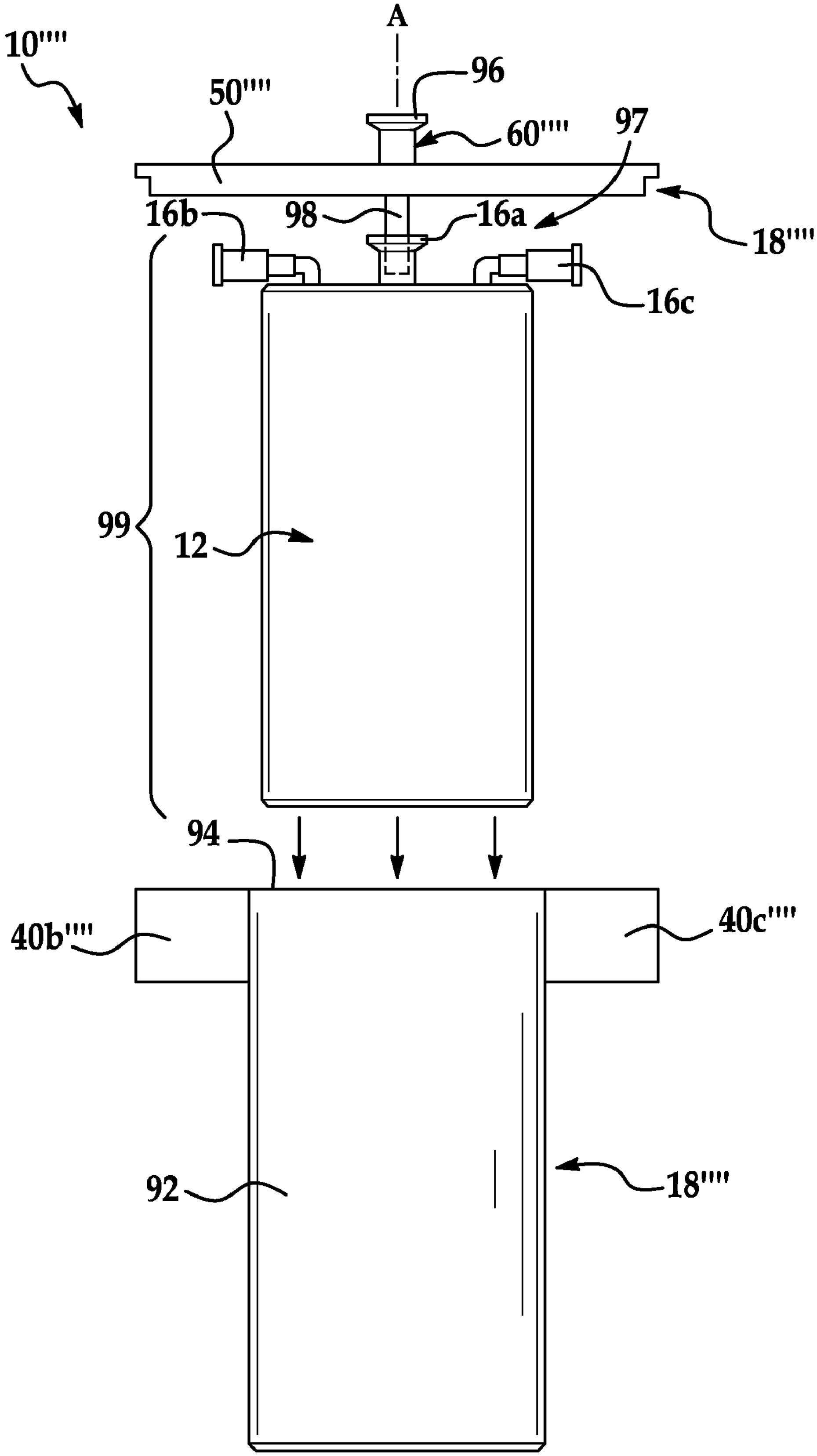
FIG. 8 is a side view of the biological material container system according to another embodiment.

Referring now to FIG. 8, another embodiment of the biological material container system 10"" will be discussed. In this embodiment, the housing assembly 18"" includes a hollow member 92. In some embodiments, the hollow member 92 is substantially cylindrical and hollow and includes an open top end 94. The hollow member 92 also includes side members **40*a*"", 40*b*"" substantially similar to the side members 40*a*, 40*b* described above in relation to FIGS. 1-4. The side members 40*a*"", 40*b*"" receive and accommodate the ports 16*b*, 16*c* of the biological material container 12**.

The housing assembly 18"" also includes a cap member 50"" that is removably coupled to the hollow member 92 adjacent the open end 94. In some embodiments, the cap member 50"" is frictionally coupled to the hollow member 92 (i.e., a frictional fitted coupling removably couples the cap member 50"" and the hollow member 92. The cap member 50"" defines the port 60"".

The port 60"" includes an outer portion 96 and a stem 98, which are in fluid communication with each other. The stem 98 removably couples to the port **16*a* of the biological material container 12. In some embodiments, the stem 98 extends into and frictionally couples to the port 16*a*; however, it will be appreciated that the stem 98 can couple to the port 16*a*** in any other suitable manner.

When assembled, the cap member 50"" covers a first portion 97 of the biological material container 12. Also, the hollow member 92 covers a second portion 99 of the biological material container 12.

To disassemble the system 10"", non-sterile personnel (e.g., the circulating nurse, etc.) removes the hollow member 92 from the cap member 50"" and moves the hollow member 92 along the axis A away from the cap member 50"". This, in turn, exposes the second portion 99 of the biological material container 12. Also, the biological material container 12 extends from and remains coupled to the cap member 50"", thereby allowing the non-sterile personnel to support the biological material container 12 by holding the cap 50"". The sterile personnel (e.g., the scrub nurse) is then able to grasp the second portion 99 of the biological material container 12 and remove the container 12 from the cap member 50"".

It will be appreciated that biological material container system 10, 10', 10", 10'", 10"" provides a useful, convenient, and effective means of maintain sterility of the biological material container 12 and the biological materials therein. The housing assembly 18, 18', 18", 18'", 18"" can be easily handled and transported between a sterile and a nonsterile field, and can be quickly and easily disassembled to expose the container 12 for removal from the housing assembly 18, 18', 18", 18'", 18"". Moreover, the housing assembly 18, 18', 18", 18'", 18"" can be reused and re-sterilized for use with a plurality of biological material containers 12. More specifically, the housing assembly 18, 18', 18", 18'", 18"" can be disassembled and reassembled repeatedly (e.g., through the frictional fittings, the threaded couplings, the bayonet couplings, and the slotted couplings, etc.) for added convenience. It will be appreciated, however, that the housing assembly 18, 18', 18", 18'", 18'" can be disposable along with the container 12.

Figure 9C:
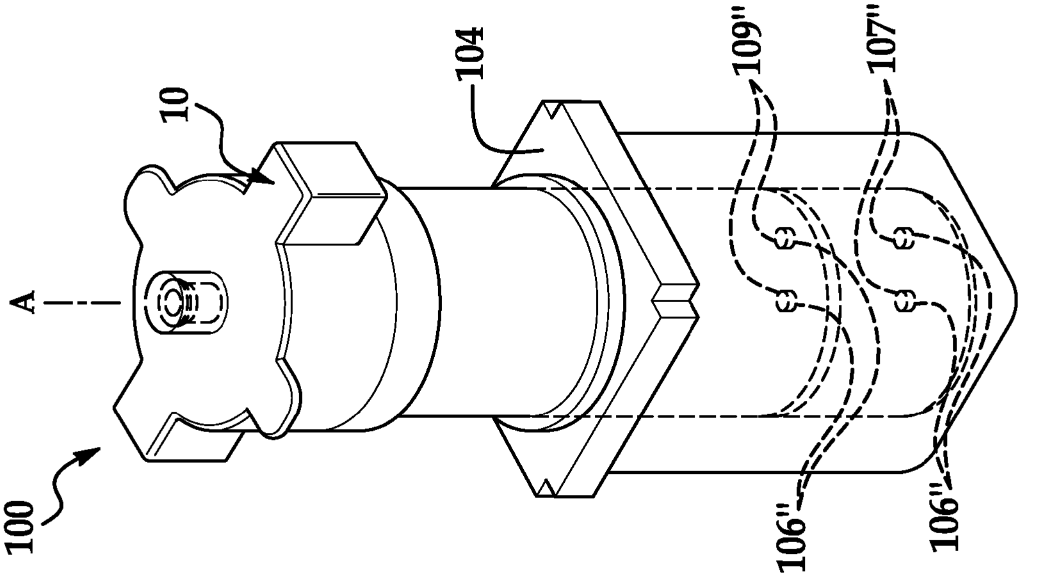
FIGS. 9A-9C are perspective views of various embodiments of a centrifuge system with a keying member.
Figure 9B:
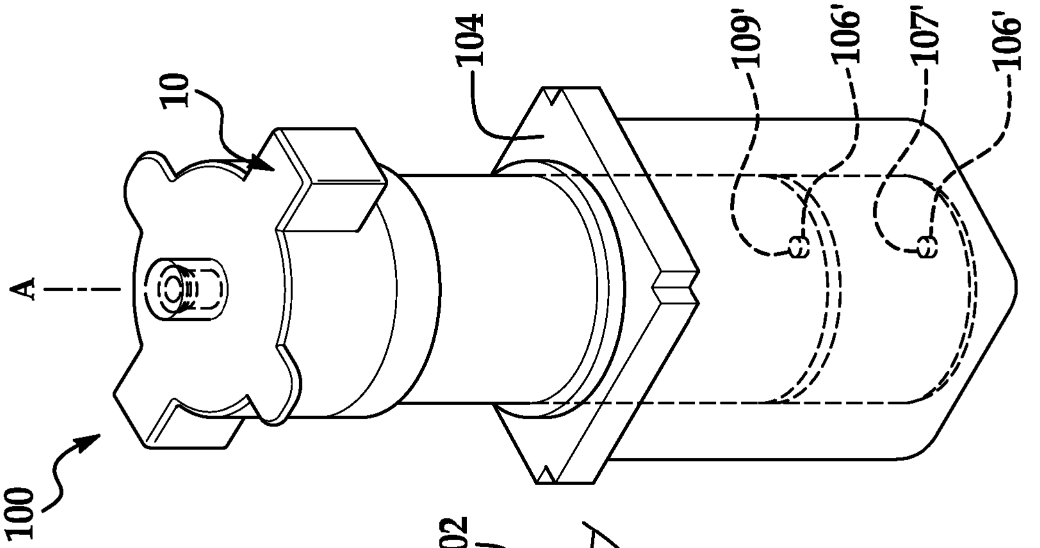
Figure 9A:
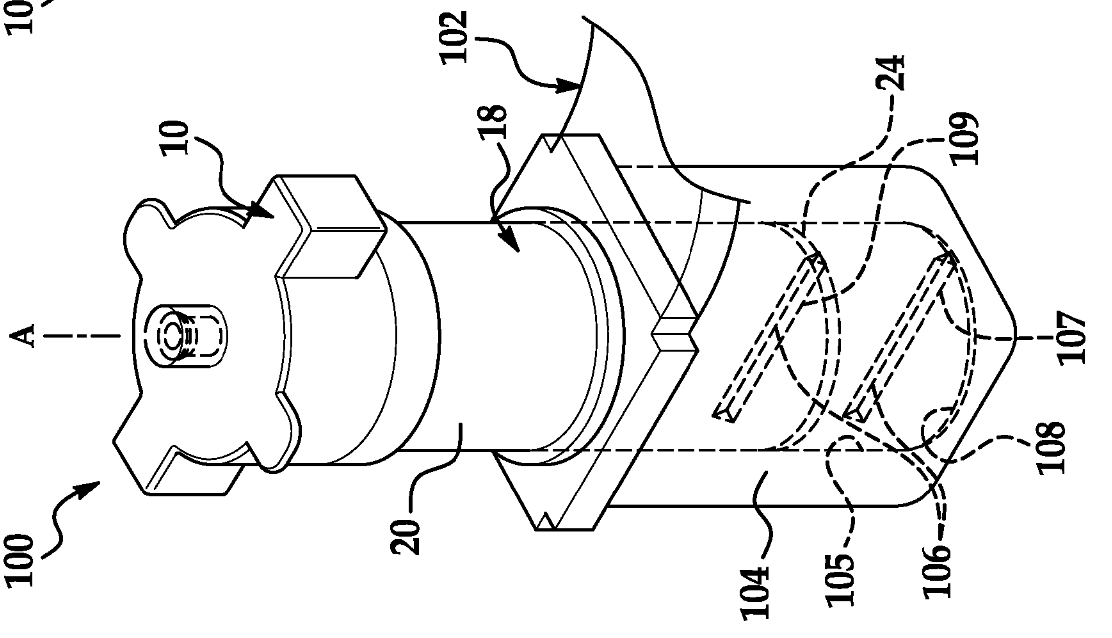

Referring now to FIG. 9A-9C, a centrifuge system 100 is illustrated. The centrifuge system 100 allows the biological material container system 10, 10', 10", 10'", 10"" to be centrifuged in a sterile manner. The centrifuge system 100 can be used in association with any of the biological material container systems 10, 10', 10", 10'", 10"" disclosed above or any other suitable biological material container system. For purposes of discussion, however, the centrifuge system 100 will be discussed in relation to the biological material container system 10 of FIGS. 1-4.

In the embodiments represented in FIG. 9A, the centrifuge system 100 includes a centrifuge 102 with a bucket 104 that receives the biological material container system 10. More specifically, the bucket 104 defines a pocket 105 into which the biological material container system 10 can be disposed. In some embodiments, the pocket 105 is substantially cylindrical and substantially conforms to the outer shape of the biological material container system 10.

The centrifuge system 100 also includes a keying member 106 that maintains a predetermined orientation of the biological container system 10 in the pocket 105. In the embodiments represented in FIG. 9A, the keying member 106 includes a projection 107 that is included on a bottom surface 108 of the pocket 105 and a corresponding recess 109 that is included on the bottom end 24 of the first member 20 of the housing assembly 18. As shown, the projection 107 and the recess 109 have an elongate shape (e.g., a linear elongate shape) that extends substantially transverse to the longitudinal axis A of the biological material container system 10. The recess 109 receives the projection 107 when the housing assembly 18 is inserted into the pocket 105. Also, when the housing assembly 18 is removed from the pocket 105, the bottom end 24 is sufficiently flat and large enough such that the housing assembly 18 can be set on and be supported by the bottom end 24.

FIGS. 9B and 9C represent other embodiments of the keying member 106', 106". In the embodiments represented in FIG. 9B, the keying member 106' includes a projection 107' and a recess 109', each having a cylindrical shape. Furthermore, in the embodiments represented in FIG. 9C, the keying member 106" includes a plurality of projections 107" and a plurality of corresponding recesses 109", each having a cylindrical shape.

In each of the embodiments represented in FIGS. 9A-9C, the keying members 106, 106', 106" are at least partially offset from the longitudinal axis A of the biological material container system 10. More specifically, in the embodiments represented in FIG. 9A, the elongate shape of the projection 107 and recess 109 extends transversely away from the axis A such that the ends of the projection 107 and recess 109 are offset from the axis A. Also, in the embodiments represented in FIG. 9B, the projection 107' and recess 109' are disposed at a distance from the longitudinal axis A. Furthermore, in the embodiments represented in FIG. 9C, one of the projections 107" and recesses 109" is disposed on the axis A, and the other projection 107" and recess 109" is disposed at a distance from the longitudinal axis A.

Accordingly, the biological material container system 10 can be inserted into the pocket 105, and the keying member 106, 106', 106" keys and substantially limits movement of the biological material container system 10 against rotation about the longitudinal axis A. As such, it can be ensured that the biological material container system 10 is properly positioned in the pocket 105 of the centrifuge 102 in a predetermined position. In some embodiments, the keying member 106, 106', 106" can be configured to ensure proper centrifuging of the biological materials in the biological material container system 10. Also, it will be appreciated that the keying member 106, 106', 106" ensures that the biological container system 10 will remain in this predetermined position. Accordingly, the biological material container system 10 is less likely to become unbalanced during centrifuging.

It will be appreciated that the keying member 106, 106', 106" can be of any suitable shape and configuration other than those illustrated in FIGS. 9A-9C. For instance, the projections 107, 107', 107" can be included on the biological material container system 10 and the recesses 109, 109', 109" can be included on the centrifuge 102. Also, the keying member 106, 106', 106" can have any suitable shape and can be included on any suitable surface of the centrifuge 102 and biological material container system 10.

Moreover, the keying member 106, 106', 106" can be configured such that the overall shape of the pocket 105 corresponds to the overall shape of the biological material container system 10 and inhibits rotation about the axis A. For instance, the pocket 105 could be shaped so as to have flat surfaces that abut against the side members 40*a*, 40*b* (FIG. 1-4) to inhibit rotation about the axis A. Also, the pocket 105 could have an overall shape having flat surfaces that abut against corresponding flat surfaces of the biological material container system 10 to key the biological material container system 10 in the pocket 105.

Moreover a plurality of buckets 104 could be provided, each with pockets 105 of unique shapes (e.g., rectangular, ovate, etc.), and a plurality of biological material container systems 10 could be provided, each having corresponding unique shapes. The biological material container systems 10 would only fit in pockets 105 having the corresponding shape. This would serve to differentiate the biological material container systems 10 for convenient identification thereof.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A transportation system for transporting a biological material container between a sterile field and a nonsterile field and substantially maintaining sterility of the biological material container, the transportation system comprising:
- a housing assembly that removably houses the biological material container;
- a port defined by the housing assembly, the port providing communication into the biological material container from outside the housing assembly; and
- a coupling member;
- the housing assembly including a first member with an open end and a closed end, the first member at least partially covering a first portion of the biological material container such that a second portion of the biological material container extends from the open end of the first member, the housing assembly further including a second member that at least partially covers the second portion of the biological material container, the second member continuously surrounding the first member adjacent the open end, the second member including a first open end and a second open end, the coupling member removably coupling the second member to the first member such that the second member can be moved relative to the first member by moving the second member away from the open end and toward the closed end of the first member such that the second member receives the first member to thereby expose the second portion of the biological material container, the second member being slidable away from the open end and slidable over the first member such that the first and second open ends receive the first member to expose the second portion of the biological material container.

2. The transportation system of claim 1, wherein the coupling member is a breakable bonded coupling.

3. The transportation system of claim 1, wherein the housing assembly further includes a cap member that at least partially covers a third portion of the biological material container.

4. The transportation system of claim 3, wherein the cap member defines the port.

5. The transportation system of claim 3, further comprising a tab coupled to the cap member, the tab enabling removal of the cap member from the housing assembly.

6. The transportation system of claim 3, wherein the cap member is removably coupled to the second member, and the second member is disposed between the cap member and the first member.

7. The transportation system of claim 1, wherein the housing assembly is substantially shaped according to an outer shape of the biological material container.

8. The transportation system of claim 1, wherein the housing assembly is substantially rigid.

9. The transportation system of claim 1, wherein the housing assembly is insertable into a centrifuge, and further comprising a keying member that keys the housing assembly in the centrifuge to maintain a predetermined orientation of the housing assembly in the centrifuge.

10. The transportation system of claim 9, wherein the centrifuge includes a bucket that receives the housing assembly, wherein the bucket includes a projection, and wherein the keying member is a recess that receives the projection.

11. The transportation system of claim 9, wherein the housing assembly defines a longitudinal axis, and wherein the keying member is at least partially offset from the longitudinal axis.

12. The transportation system of claim 1, wherein the second member receives the first member by moving over an outer surface of the first member to thereby expose the second portion of the biological material container.

13. A biological material container system comprising:

a biological material container that includes a first portion and a second portion; and a transportation system for transporting the biological material container between a sterile field and a nonsterile field and substantially maintaining sterility of the biological material container, the transportation system comprising:

a housing assembly that removably houses the biological material container;

a port defined by the housing assembly, the port providing communication into the biological material container from outside the housing assembly; and a coupling member;

the housing assembly including a first member with an open end and a closed end, the first member at least partially covering the first portion of the biological material container such that the second portion of the biological material container extends from the open end of the first member, the housing assembly further including a second member that at least partially covers the second portion of the biological material container, the second member continuously surrounding the first member adjacent the open end, the second member including a first open end and a second open end, the coupling member removably coupling the second member to the first member such that the second member can be moved relative to the first member by moving the second member away from the open end and toward the closed end of the first member such that the second member receives the first member to thereby expose the second portion of the biological material container, the second member being slidable away from the open end and slidable over the first member such that the first and second open ends receive the first member to expose the second portion of the biological material container.

14. The biological material container system of claim 13, wherein the second member receives the first member by moving over an outer surface of the first member to thereby expose the second portion of the biological material container.

* * * * *